(12) United States Patent
Sullivan

(10) Patent No.: US 10,094,452 B1
(45) Date of Patent: Oct. 9, 2018

(54) CONTINUOUSLY VARIABLE TRANSMISSION FOR A BICYCLE

(71) Applicant: Mark B. Sullivan, Charlotte, NC (US)

(72) Inventor: Mark B. Sullivan, Charlotte, NC (US)

(*) Notice: Subject to any disclaimer, the term of this patent is extended or adjusted under 35 U.S.C. 154(b) by 12 days.

(21) Appl. No.: 15/050,443

(22) Filed: Feb. 22, 2016

Related U.S. Application Data

(63) Continuation-in-part of application No. 14/198,587, filed on Mar. 5, 2014, now abandoned.

(60) Provisional application No. 62/118,488, filed on Feb. 20, 2015, provisional application No. 61/773,140, filed on Mar. 5, 2013.

(51) Int. Cl.
*F16H 9/24* (2006.01)

(52) U.S. Cl.
CPC ...................................... *F16H 9/24* (2013.01)

(58) Field of Classification Search
CPC ............ F16H 9/24; B62M 9/08; B62M 9/085
See application file for complete search history.

(56) References Cited

U.S. PATENT DOCUMENTS

| | | |
|---|---|---|
| 1,872,636 A | 8/1932 | Greening |
| 3,420,113 A | 1/1969 | Tauscher |
| 4,164,153 A * | 8/1979 | Moritsch .................. B62M 9/08 280/236 |
| 4,181,043 A * | 1/1980 | Waddington ............. B62M 9/08 475/16 |
| 4,276,784 A * | 7/1981 | Waddington ............. B62M 9/08 74/336 R |
| 4,277,986 A | 7/1981 | Waddington |
| 4,299,581 A | 11/1981 | Korosue |
| 4,660,427 A | 4/1987 | Fenton |
| 4,697,469 A | 10/1987 | Takamiya et al. |
| 4,712,450 A | 12/1987 | Takamiya et al. |
| 4,732,054 A | 3/1988 | Takamiya et al. |
| 4,772,250 A | 9/1988 | Kovar |
| 4,800,768 A | 1/1989 | Kazuta |
| 4,816,009 A | 3/1989 | Philipp |
| 4,850,939 A | 7/1989 | Chilcot |
| 4,892,506 A | 1/1990 | Wen |

(Continued)

FOREIGN PATENT DOCUMENTS

| | | |
|---|---|---|
| EP | 0262841 B1 | 9/1991 |
| EP | 0280481 A2 | 4/1992 |

*Primary Examiner* — William E Dondero
*Assistant Examiner* — Robert T Reese
(74) *Attorney, Agent, or Firm* — Everman Law Firm, P.A.; Gregory R. Everman

(57) ABSTRACT

A transmission for a bicycle having a driver assembly with a torque band, the driver assembly being pivotable about a first axis. A driven assembly rotatable about a second axis, the second axis spaced a distance from the first axis. The torque band is rotatable about the second axis. An input source engaged with the driver assembly such that the input source causes the torque band to rotate about the second axis. The driver assembly principally engages said driven assembly along an engagement path at a first distance from the first axis and at a second distance from the second axis whereby the driven assembly is caused to rotate about the second axis, the second distance being infinitely adjustable throughout a gear ratio range. A rotatable output member is engaged with the driven member wherein rotation of the driven member causes the output member to rotate.

11 Claims, 14 Drawing Sheets

(56) References Cited

U.S. PATENT DOCUMENTS

| | | | |
|---|---|---|---|
| 4,916,974 A | | 4/1990 | KozaKae et al. |
| 5,354,240 A | * | 10/1994 | Hunter, Jr. ............. B62M 9/085 |
| | | | 474/57 |
| 5,492,026 A | * | 2/1996 | Olde Heuvel ......... B62M 9/085 |
| | | | 475/170 |
| 5,516,132 A | | 5/1996 | Simkins |
| 5,632,702 A | | 5/1997 | Mills |
| 6,447,421 B1 | | 9/2002 | Wren |
| 2010/0203990 A1 | * | 8/2010 | Kwok .................... B62M 9/085 |
| | | | 474/69 |

* cited by examiner

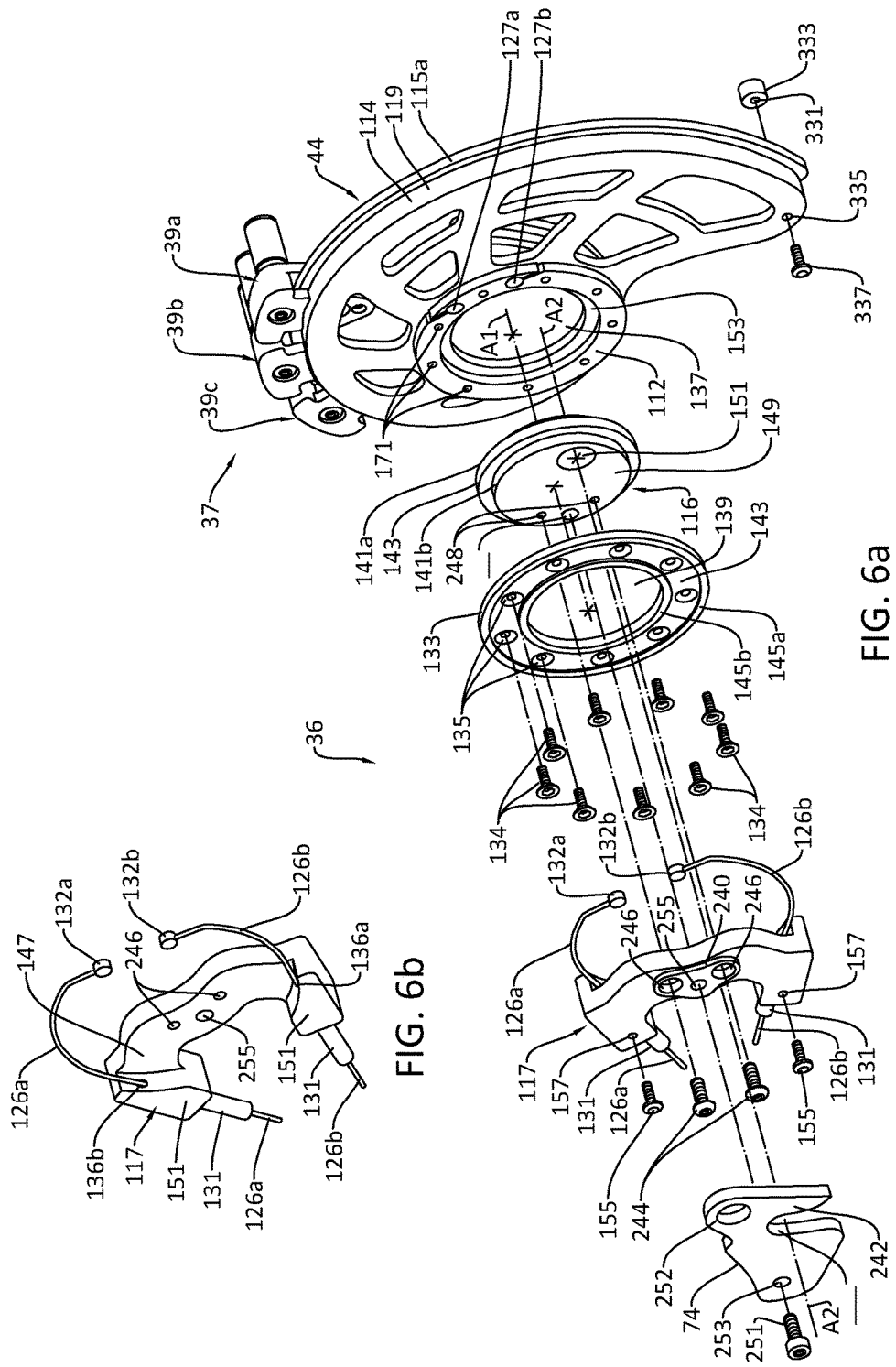

ically a
CONTINUOUSLY VARIABLE TRANSMISSION FOR A BICYCLE

CROSS REFERENCE TO RELATED APPLICATIONS

This application claims the benefit of U.S. Provisional Application No. 62/118,488, filed Feb. 20, 2015; and also this application is a continuation-in-part of application Ser. No. 14/198,587, filed Mar. 5, 2014, which claims the benefit of U.S. Provisional Application No. 61/773,140, filed Mar. 5, 2013, each of which are incorporated herein by reference in their entirety

BACKGROUND OF THE INVENTION

1. Field of the Invention

The present invention relates to the field of continuously variable transmissions and, more specifically, to a continuously variable transmission for a bicycle.

2. Description of the Related Art

Most bicycles use a transmission made up of multiple sized driver sprockets and driven sprockets, joined by a chain, to transmit rotary motion there-between. Typically, a peddle shaft carries two or three driver sprockets and a freewheel carries five to seven driven sprockets. A rider is able to select a gear ratio in stepwise fashion by means of a derailleur to suit the conditions and rider's preference for speed and ease of peddling. A greater the number of sprockets allows for better incremental control of gear ratios; notwithstanding, conventional transmissions are limited to predetermined discrete gear ratios.

Conventional bicycle transmissions are also prone to malfunction. Shifting a transmission under a full load can cause damage to the transmission, loss of torque due to chain slippage, and chain derailment. The transmission can also experience a slight lag while changing gear ratios, resulting in a temporary loss of torque which is particularly undesirable when climbing a step grade.

Conventional transmissions can also be difficult to operate. A pair of gear levers must be considered in combination to achieve a desired gear ratio.

Accordingly, there is a need in the art for a transmission useable with a bicycle that allows for stepless shifting, with infinitely selectable gear ratios, between high gear and low gear. Also needed in the art is a transmission that does not experience chain slippage, lag, or chain derailment when changing gear ratios, even under full load conditions. Further needed is for such transmission to be simple to use.

BRIEF SUMMARY OF THE INVENTION

To achieve the foregoing and other objects, the present invention, as embodied and broadly described herein, provides various embodiments of a transmission and more particularly a transmission for a bicycle that allows for stepless shifting, with infinitely selectable gear ratios, between high gear and low gear.

In an embodiment of the invention, a transmission includes a driver assembly pivotable about a first axis; a driven assembly rotatable about a second axis, the second axis spaced a distance from the first axis; and the driver assembly adapted for communicating with the driven assembly at an engagement distance from the second axis such that the driven assembly is caused to rotate about the second axis, the engagement distance being infinitely adjustable throughout a gear ratio range. Further aspects of the invention may include one or more of the following: i) the engagement distance is adjustable by pivoting the driver assembly about the first axis, ii) the first and second axes remain at a fixed distance relative to each other throughout the gear ratio range, and iii) the engagement distance is continuously adjustable throughout the gear ratio range.

BRIEF DESCRIPTION OF THE DRAWINGS

The above described and other features, aspects, and advantages of the present invention are better understood when the following detailed description of the invention is read with reference to the accompanying drawings, wherein:

FIG. 5B is a top, left, front perspective view of another embodiment of a guide which communicates with the user controllable shifter of FIG. 1, the pivot assembly, and roller assembly as illustrated in FIG. 5a;

FIG. 6A is an exploded top, right, front perspective view of the pivot assembly of FIG. 3;

FIG. 6B is a top, left, rear perspective view of the cable bracket assembly which forms part of the pivot assembly of FIG. 6A;

FIG. 7C is a top, right, front perspective view of another embodiment of a guide which communicates with the user controllable shifter of FIG. 1, the pivot assembly, and roller assembly as illustrated in FIG. 5a;

DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be considered as limited to the embodiments set forth herein. These exemplary embodiments are provided so that this disclosure will be both thorough and complete, and will fully convey the scope of the invention to those skilled in the art. Like reference numbers throughout the several views of the drawings designate like parts. Throughout the drawings where a plurality of a component is illustrated, a representative sample of the component may be identified by reference number and/or reference lines as one skilled in the art will understand commonality of the unlabeled component with the labeled component. Orientation terms, such as left, right, front and back, and derivations thereof, are in context of a person in riding position on a bicycle and are not to be construed as limiting the scope of the invention.

The present invention is a transmission for a bicycle that allows for stepless shifting, with infinite selectable gear ratios, between high gear and low gear. The present invention has particular application with a bicycle and is accordingly described and illustrated herein with reference to a bicycle. Notwithstanding, it is anticipated that the present invention may be employed in connection with other types of machines that utilize a transmission. For example, and not to be construed as limiting, the transmission may be used in (i) a motorized vehicle such as an automobile, motorcycle, or watercraft, (ii) a non-motorized vehicle such as a bicycle, tricycle, scooter, or exercise equipment, or (iii) industrial power equipment, such as a drill press. Thus, use of the transmission in any of a wide variety of machines is within the spirit and scope of the present invention.

Figure 1:
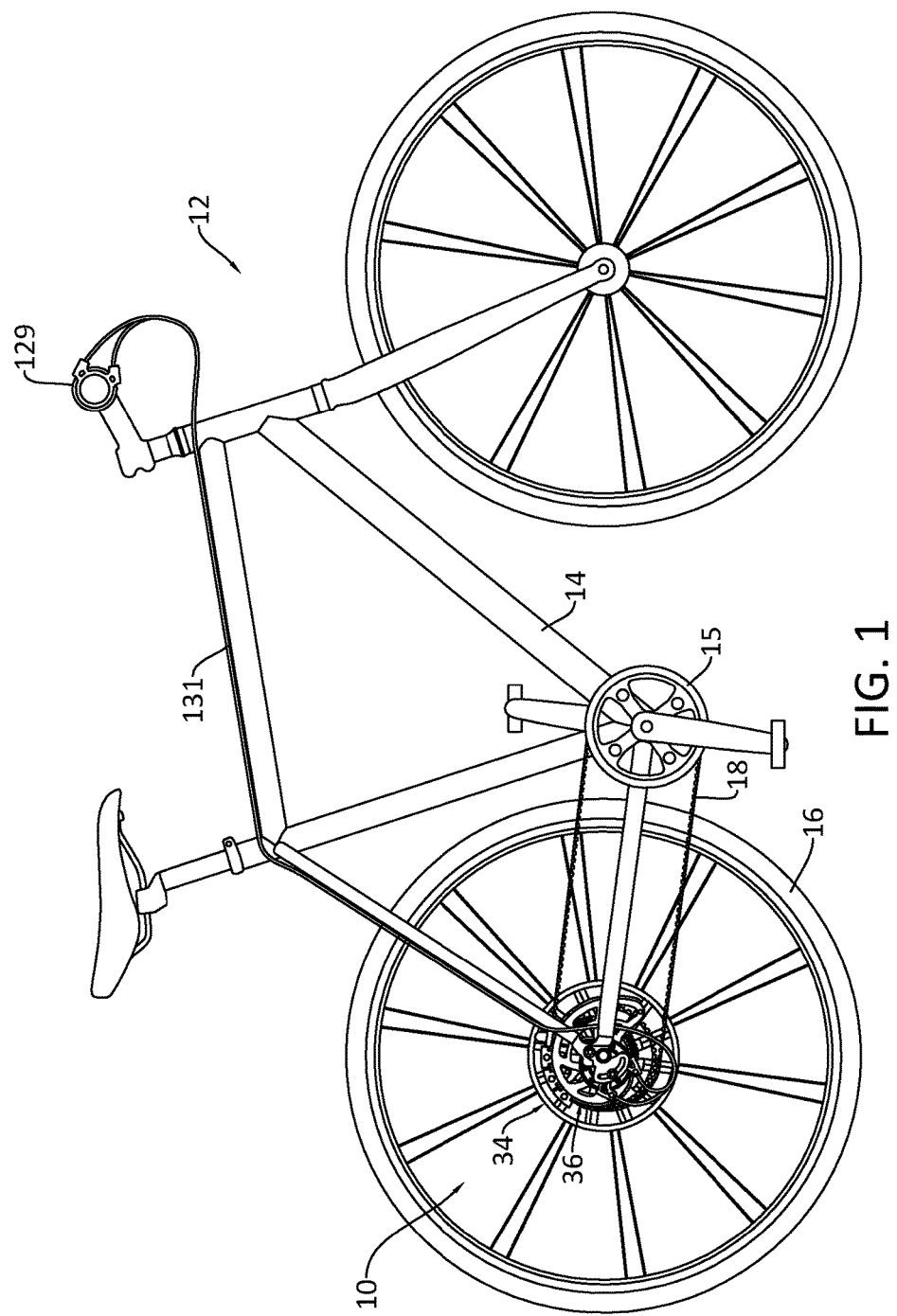
FIG. 1 is a side view of a continuously variable transmission, as applied to a bicycle, in accordance with an embodiment of the present invention.
Figure 2:
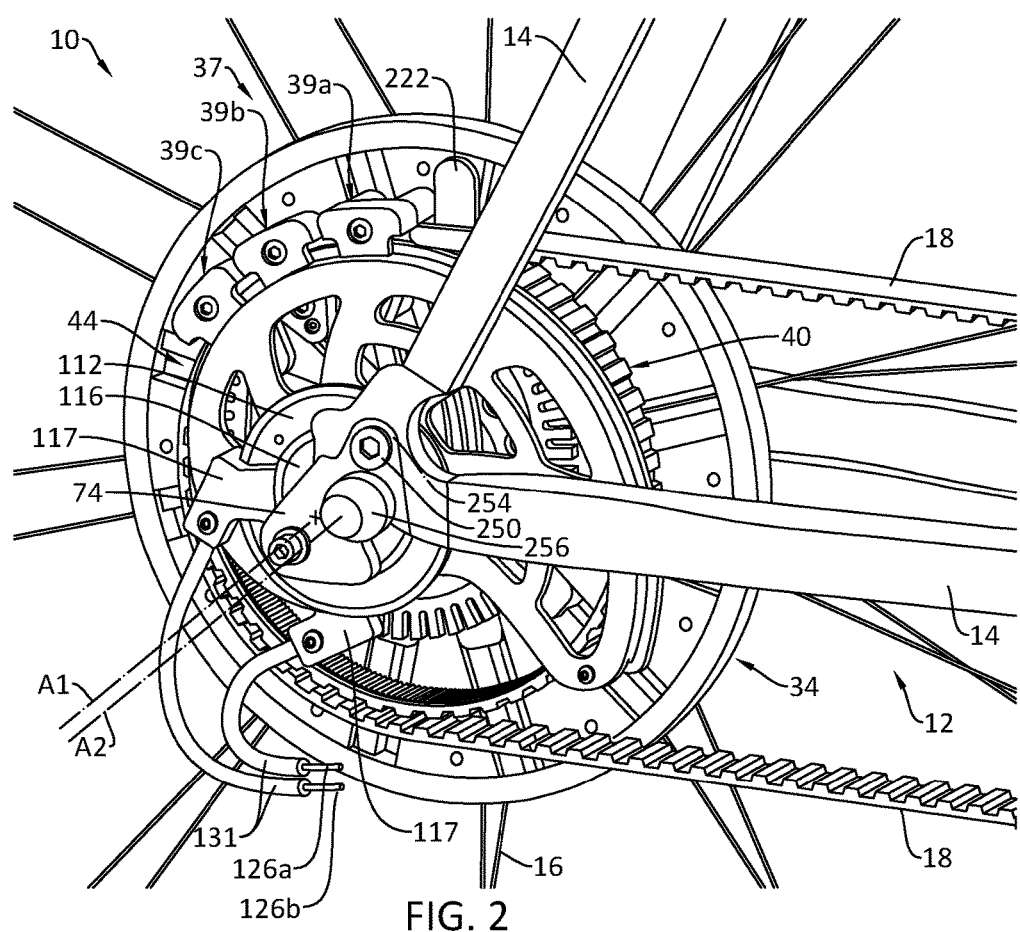
FIG. 2 is a top, right, front perspective view of the continuously variable transmission of FIG. 1.

Referring to the drawings and particularly FIGS. 1 and 2, a transmission 10 is illustrated in accordance with an embodiment of the present invention. The transmission 10 is attached to and communicates with a machine, for example a bicycle 12.

The bicycle 12 includes a frame 14, rear wheel 16, and freehub 20 (FIGS. 3 and 11), as conventionally known. The freehub 20 comprises a fluted shaft 22 with a threaded inner opening 24 and a threaded inner shaft 26 coaxial with the fluted shaft 22, as illustrated in FIG. 3.

The transmission 10 is attached to the freehub 20, replacing the standard multiple sprocket transmission of a bicycle 12. It is to be understood that the output side of the transmission 10 may be configured to attach to any type of shaft or the like depending on the machine with which the transmission 10 is being used. Likewise, on the input side, the belt 18 may be replaced with a roller chain, or other suitable known drive mechanism. Furthermore, depending on the application it may also be desirable to interconnect a plurality of transmissions 10.

In general, input energy applied to the transmission 10, provided by a person peddling the bicycle 12, or from an engine, motor, or other source depending on the application (collectively and individually "input source"), is ultimately outputted by the transmission 10 to drive an output shaft, wheel, gear or the like (collectively and individually "output member"), for example the freehub 20 of the bicycle 12. Depending on the application, the driven member described herein-below may also be considered an output member by being incorporated into a wheel, one way clutch, gear or the like.

Figure 3:
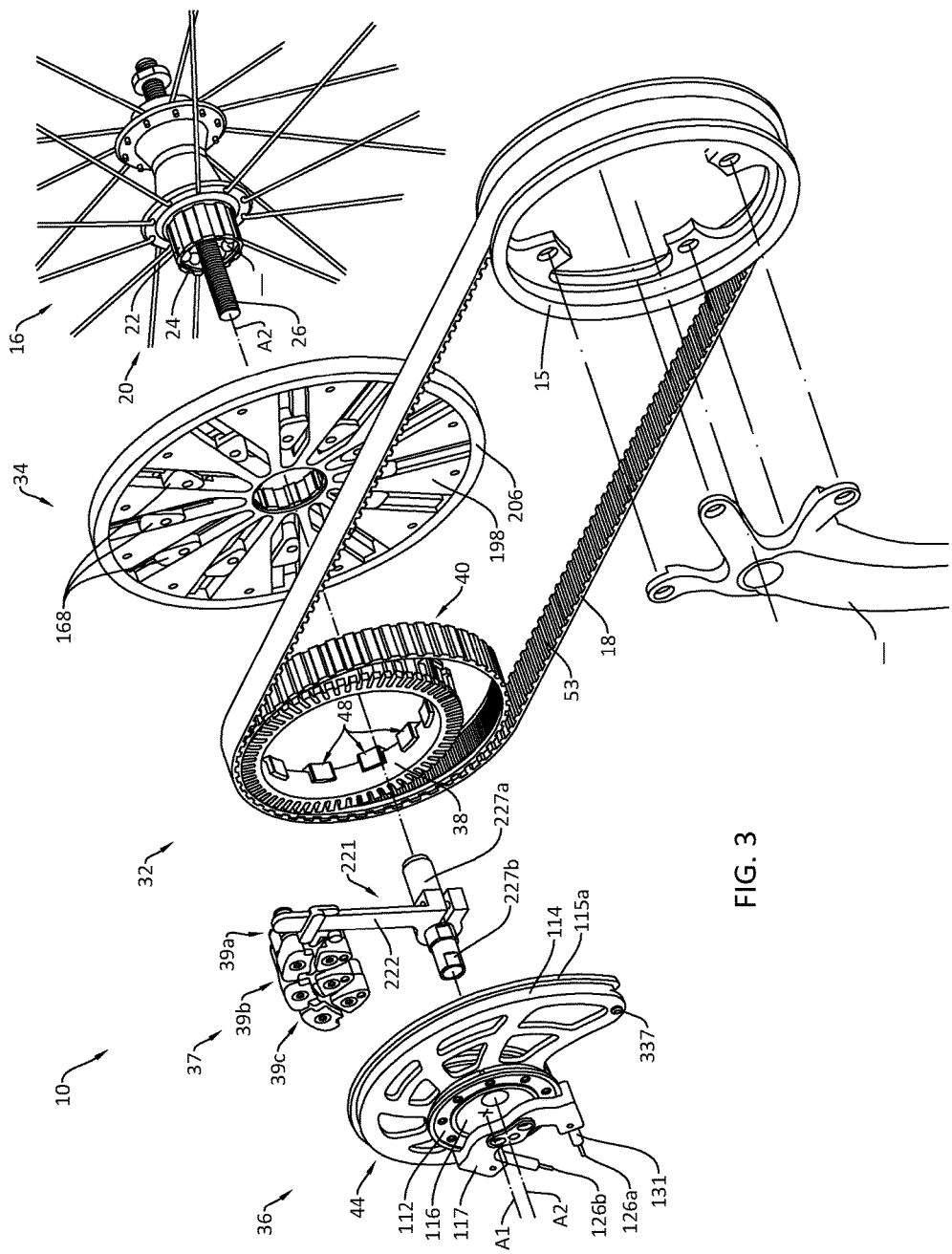
FIG. 3 is an exploded perspective view of the transmission of FIG. 2, showing a driver assembly, a driven assembly, a pivot assembly, and a roller assembly which form the principal components of the transmission.

Referring to FIG. 3, the primary component assemblies of the transmission 10 are the driver assembly 32, driven assembly 34, pivot assembly 36, and a roller assembly 37. The driver assembly 32 is connected to belt 18 and the driven assembly 34 such that input energy from peddling the bicycle 12 (FIG. 1) is transmitted through the driver assembly 32 to the driven assembly 34, causing the driven assembly 34 to rotate. The driven assembly 34, being connected to the freehub 20, transmits energy from the driver assembly 32 to the freehub 20 causing the freehub 20 and thus the bicycle wheel 16 to rotate.

The pivot assembly 36 includes a non-circular pivot frame 44 which is pivotally engaged on a circular pivot means 116, which is attached to the bicycle 12 such that they preferably do not pivot relative to each other; whereas the driver assembly 32 is engaged within the roller assembly 37, and the roller assembly 37 is slidably secured to the non-circular pivot frame 44, so that relative positioning of the driver assembly 32 to the bicycle 12, driven member 34, and pivot assembly 36 may be adjusted thereby allowing for stepless shifting of the transmission.

Figure 4:
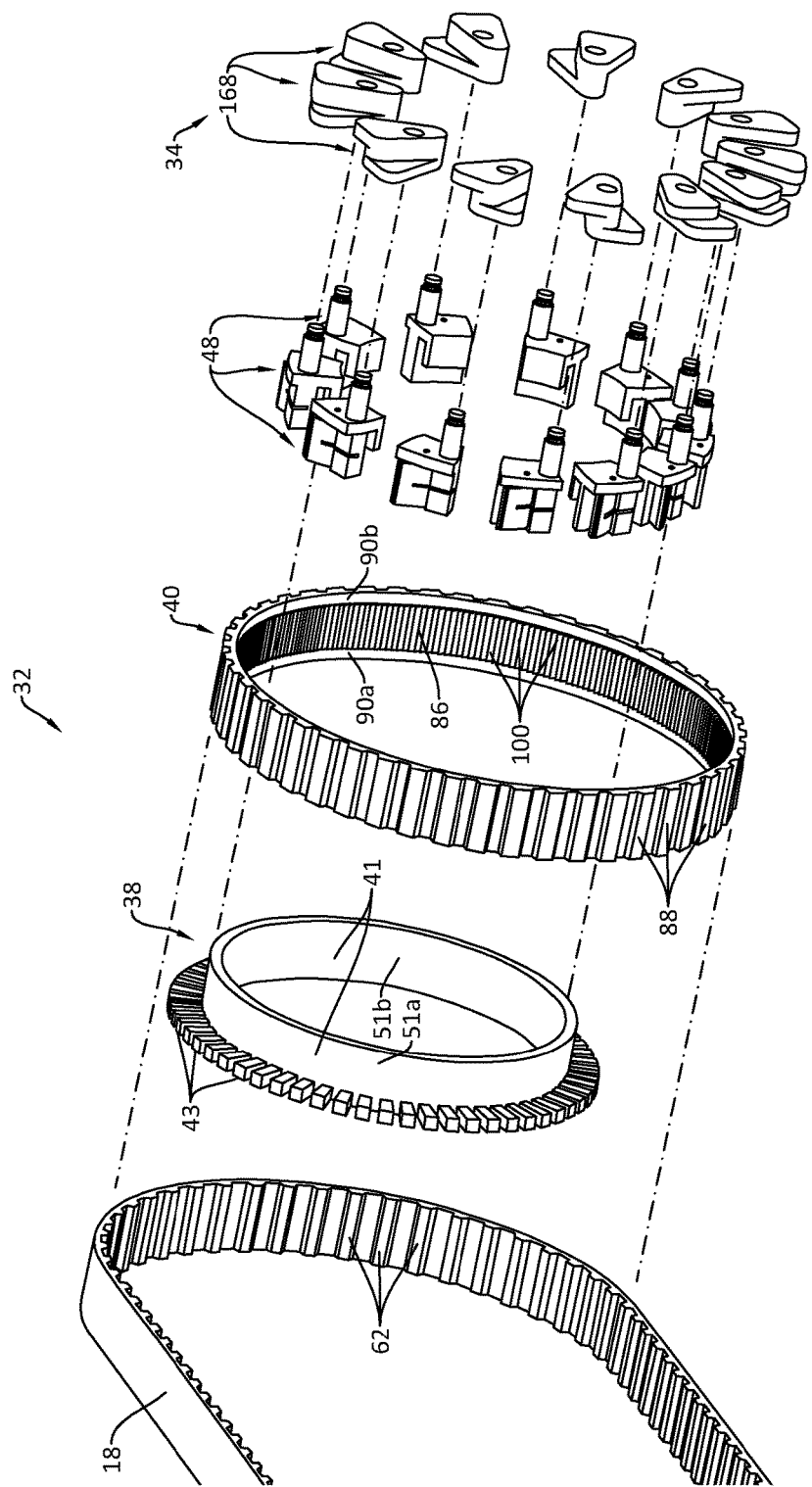
FIG. 4 is an exploded, top, left, front perspective view of the driver assembly of FIG. 3.

Referring to FIGS. 3 and 4, the driver assembly 32 includes a guide band 38, torque band 40, and at least one engagement member (for example, the illustrated pawl and carrier assemblies) 48 which are pivotally engaged to the pressure pad 168 of the driven assembly 34.

The guide band 38 includes a flexible base 41 having internal and external surfaces (i.e. races) 51A and 51B that defines a pathway on which a plurality of engagement member 48 travel about the circumference of base 41. The recess 181 (FIG. 10A) of the engagement member 48 is slidably engaged by the first and second races 51A, 51B.

The guide band 38 includes a plurality of support curb 43 on the external surface of base 41 segmented to a allow bending of base 41.

Referring to FIG. 4, the torque band 40 includes a flexible endless loop belt with a plurality of external teeth 88 on its outer surface, and a plurality of internally directed teeth 100 laterally bounded by continuous curb recess 90a and 90b on its inner surface, which collectively form the internally toothed ratchet 86, which selectively engages the engagement members 48 traveling on the circumference of the guide band 38.

Figure 9:
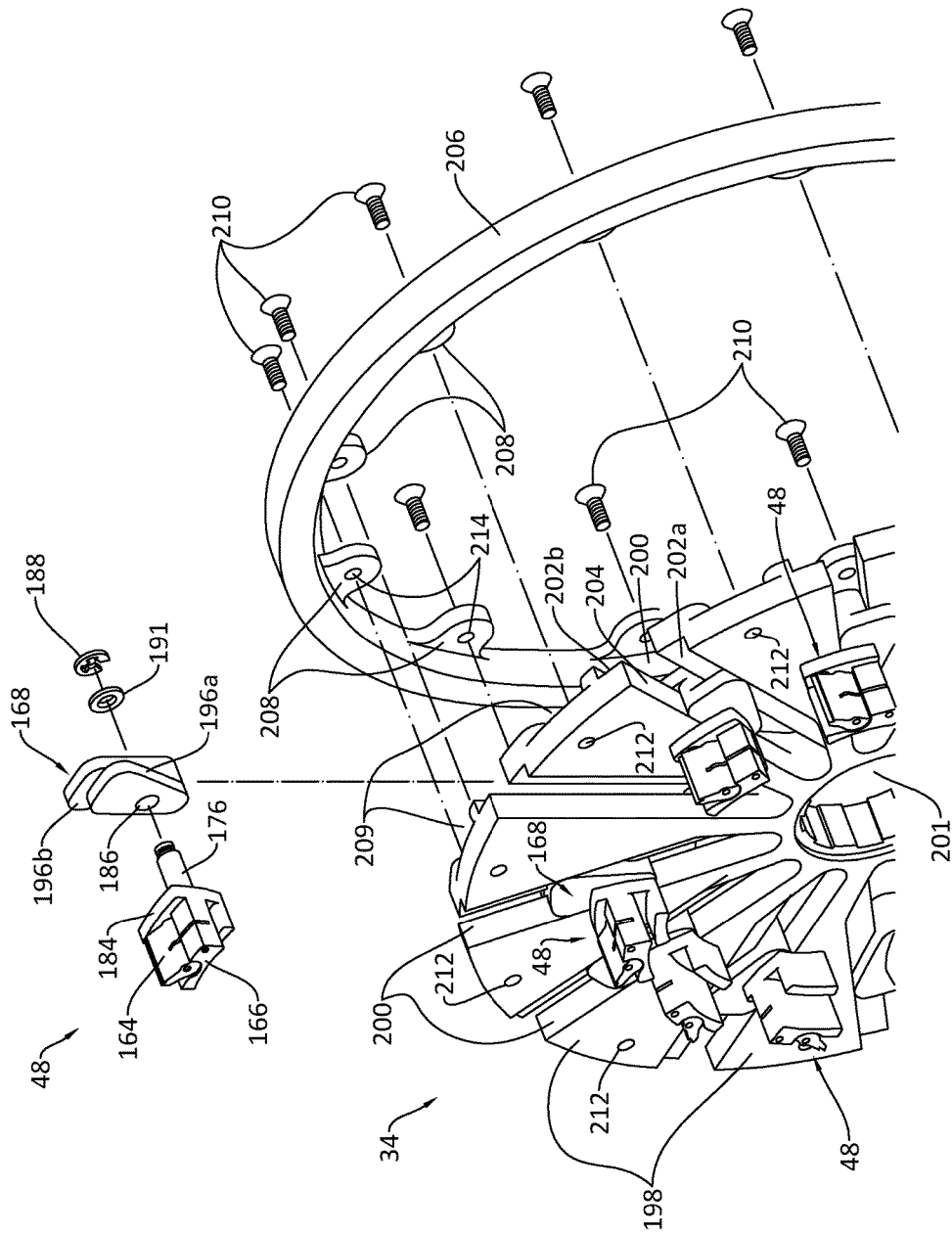
FIG. 9 is a fragmented, partially exploded, perspective view of the driven assembly of FIG. 3.

As driver assembly communicates with belt 18, a section of the driver assembly 32 is engaged by roller assembly 37 and is sandwiched within a plurality of roller clamp assembly 39, causing bending of torque band 40 and guide band 38. Flexible belt 18 and base 41 remain parallel as continuous curbs 90a and 90b are engaged to a section of corresponding support curb 43 and a plurality of upper curb 184 of engagement member 48 (FIG. 9).

Figure 5A:
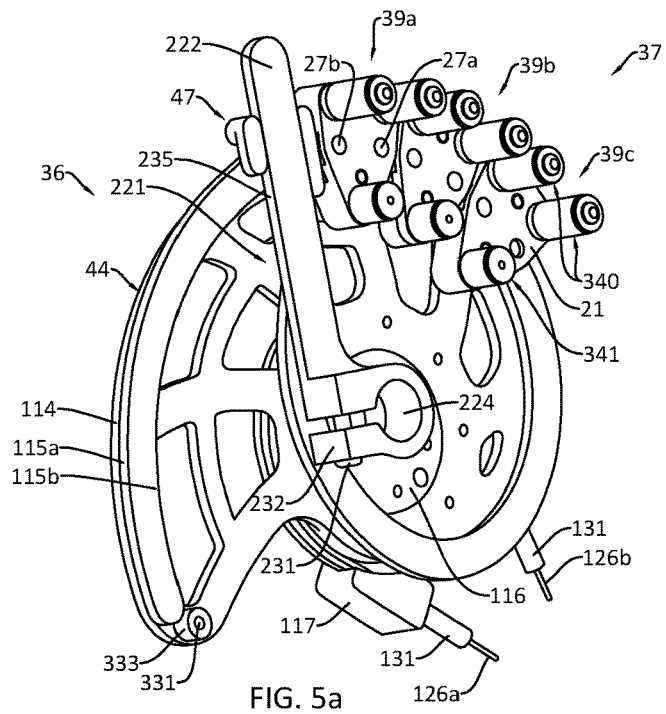
FIG. 5A is a top, left, front perspective view of the pivot assembly and roller assembly of FIG. 3.
Figure 5B:
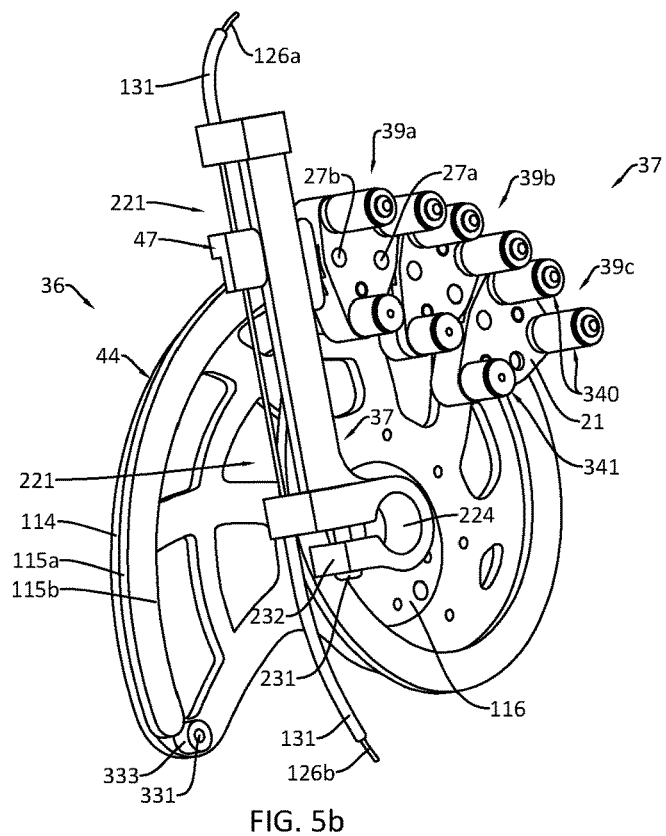

The guide band 38 is laterally bounded by the carrier 166 and face 21 (FIG. 5A) of roller assembly 39.

In the preferred embodiment, external teeth 88 communicate with the drive belt 18 and the internally toothed ratchet 86 communicate with the engagement members 48. In the preferred embodiment, but not to be construed as limiting, the engagement means 48 are made of rigid, high strength material, preferably metal, and the drive belt 18 and guide band 38 are made of flexible, high strength materials.

At the input side, the torque band 40 communicates with, and is caused to rotate eccentrically about driven assembly axis A2 by, the drive belt 18. At the output side, the torque band 40 communicates with the driven assembly 34 by means of the engagement members 48 causing the driven assembly 34 to rotate about its geometric center, identified as driven assembly axis A2. Axes A1 and A2 do not coincide, that is they are spaced a distance apart from each other.

Referring to FIGS. 3, 5A, 5B, and 6, the pivot assembly 36 includes adapter bracket 74, cable bracket 117, pivot means 116, and pivot frame 44 and allows for stepless shifting of the transmission 10 with infinite selectable gear ratios between high gear and low gear.

The pivot assembly 36 is attached to the machine and/or output member (e.g. the bicycle in the illustrated embodiment) such that the pivot assembly 36 does not pivot about driven assembly axis A2 and defines the position of driver assembly axis A1 relative to driven assembly axis A2. The axes A1 and A2 are each offset a distance from each other and fixed in position relative to each other, which is of importance to adjustability of the gear ratios.

Referring to FIGS. 2, 3, 6, and 11 the pivot frame 44 includes a circular first ring 112 and a non-circular external surface (i.e. race) 114 eccentric to the first ring 112; a non-circular support rib 119 extending outwardly from the leftward face of pivot frame 44 with an external surface defining a portion of race 114; a flange with external surface 115A and internal length 115B which parallels the first race 114 with the same circumferential shapes, albeit with corresponding greater and lesser length lengths than external surface 115A.

The pivot means 116 includes first and second external surfaces (i.e. races) 141a and 141b, a flange 143 dividing the first and second external surfaces 141a, 141b and extending outwardly. The race 141a is rotatably disposed in aperture 137 of pivot frame 44 and race 141b is rotatably disposed in aperture 139 of ring 133.

The ring 133 is fixed to first ring 112 with fasteners 134 which are received through the first apertures 135 and engaged within threaded apertures 171, whereby pivot means 116 is laterally bounded by ring 133 and the first ring 112, and the pivot frame 44 may rotate about axis A1 and relative to the pivot means 116. The apertures 135 are conical shaped to receive correspondingly shaped fasteners 134. A circular fastener recess 143 is spaced a distance laterally from adjacent face rings 145A and 145B.

The face 149 of pivot means 116 is spaced a distance laterally from face rings 145B and 145B such that the face 149 provides a platform for mounting cable bracket 117, and to allow relative rotation of pivot assembly 36 in relation to cable bracket 117 and bicycle 12. The face 147 of cable bracket 117 is fixedly attached to face 149 of pivot means 116 with fasteners 244 which are received through apertures 246 and engaged within threaded apertures 248.

The adapter bracket 74 is fixedly attached to the bicycle frame 14 by a threaded fastener 250 received through the first aperture 252 and engaged within threaded aperture 254 (not shown) in bicycle frame 14. The portion 242 forms a hook which rest upon the threaded inner shaft 26 (FIG. 3) of the freehub 20, thereby supporting bicycle frame 14. A threaded cap 256 (FIG. 2) secures the frame 14 and adapter bracket 74 to the threaded shaft 26. As the adapter bracket 74 is fixedly attached to the bicycle frame 14, the adapter bracket 74 and by extension the pivot assembly 36, do not pivot relative to driven assembly axis A2.

The adapter bracket 74 and is engaged against the rightward face of curb 240 of the cable bracket 117 and fixedly attached by a threaded fastener 251 received through the first aperture 253 and engaged within threaded aperture 255 in cable bracket 117. The lateral width of the curb 240, causes the cable bracket 117 to be spaced a distance from the face of adapter bracket 74.

Referring to FIGS. 6A and 6B, the pivot assembly 36 provides a means for pivoting the first ring 112 about axis A1 by a shifter 129 (FIG. 1) for alternately pulling or loosening the cables 126a and 126b, and thusly pivoting the remaining components of the pivot frame 44 about axis A1. The pivot assembly 36 includes control cables 126a and 126b disposed in housings 131 with end terminators 132a and 132b fixedly attached to corresponding cables 126a and 126b, and disposed respectively into cable receptors 127a and 127b of first ring 112.

The control cables 126a and 126b extend from the end terminators 132a and 132b circumferentially around a segment of the first ring 112 and are disposed through apertures 136a and 136b of cable bracket 117 and continue to the shifter 129 (FIG. 1). Ring 133 is fixed to first ring 112 so that the cables 126a and 126b do not laterally slip off of the first ring 112 when pivoting the pivot assembly 36. The cable receptors 127a and 127b are located on the first ring 112 at a position whereby the pivot assembly 36 may be selectively rotated counterclockwise and clockwise by pulling the first cable 126a or second cable 126b, respectively.

Although a preferred embodiment of the pivot assembly 36 has been described in reference to the drawings, other types of adjustment means which can pivot the first ring 1122 and thusly the pivot assembly 36 about driver assembly axis A1 are within the scope of the present invention. Examples of alternative embodiments of adjustment means (not illustrated), include adding a torsion spring to the preferred embodiment wherein the torsion spring is engaged between the first ring 112 and pivot assembly pivot means 116 thereby biasing the pivot assembly 36 towards clockwise rotation until the energy of the spring is overcome by use of shifter 129; a motorized or manually controllable actuator arm pivotally attached to the first ring 112, wherein the arm can rotate the first ring 112 clockwise or counterclockwise; or other suitable means for rotating the first ring 112 about the axis A1.

Referring to FIGS. 4, 9, 10a, 10b, 11 and 12, engagement members 48 are provided to transmit output torque from driver assembly 32 to driven assembly 34. Each engagement member 48 includes a pawl 164 and carrier 166 rotatably coupled to a pressure pad 168.

The pawl 164 has at least one tooth 170 (e.g. a plurality of teeth are shown) which is configured to engage the internally toothed ratchet 86 of the torque band 40, The teeth 170 are configured to mate with teeth 100 of the internally toothed ratchet 86 thereby allowing input force to be transmitted through the engagement member 48 to the driven assembly 34. The pawl 164 also includes a channel 172 and an aperture 173, as illustrated in FIG. 10a.

Figure 10A:
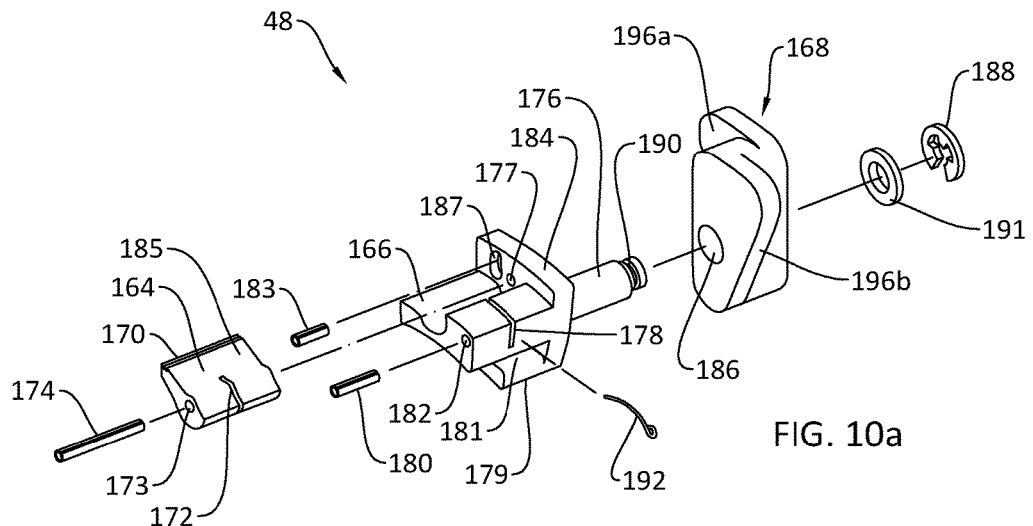
FIG. 10A is an exploded, top, right, front perspective view of the means of the engagement member which forms part of the driven assembly of FIG. 9.

Referring to FIG. 10a, peg 174 is received within the aperture 173 of the pawl 164 with sufficient tolerance to allow relative rotation between the pawl 164 and the carrier 166 and is fixed within the aperture 177 of the carrier 166.

A peg 183 is fixed within the aperture 185 (hidden) of the pawl 164 and is received within radial pocket 187 with sufficient tolerance to allow limited relative rotation between the pawl 164 and the carrier 166.

A post 176 is received within an aperture 186 of the pressure pad 168 with sufficient tolerance to allow relative rotation between the carrier 166 and pressure pad 168. A washer 191 is disposed over post 176 and a retaining ring 188 is disposed in a corresponding groove 190 of post 176 thereby securing together the carrier 166 and pressure pad 168.

The carrier 166 has a channel 178 and a peg 180 fixed within an aperture 182 and extending across the channel 178. A tension inducer spring 192 is disposed in the pawl and carrier channels 172, 178 and fixed to the carrier 166 and pawl 164. The spring 192 biases the pawl 164 outwardly causing the tooth 170 to engage the internally toothed ratchet 86 as the engagement members 48 travels about the guide band 38 (FIGS. 14a, 14b, 14c and 16).

The carrier 166 includes a lower curb 179 which extends partially to the lateral depth of carrier 166 to form recess 181 for slidable engagement with base 41 of guide band 38 that defines a flexible and non-circular pathway on which engagement members 48 travel about a circumference of the guide band 38. Preferably, the upper and lower surfaces of the carrier 166 which form recess 181 are curved with forward and rearward radiuses to reduce any risk of binding of the carrier 166.

As the driver assembly 32 travels between roller clamp assemblies 39 of the roller assembly 37, the upper curb 184 of carrier 166 engages curb recess 90b of torque band 40, so as to maintain the position of torque band 40 in relation to means of engagement member 48.

Figure 10B:
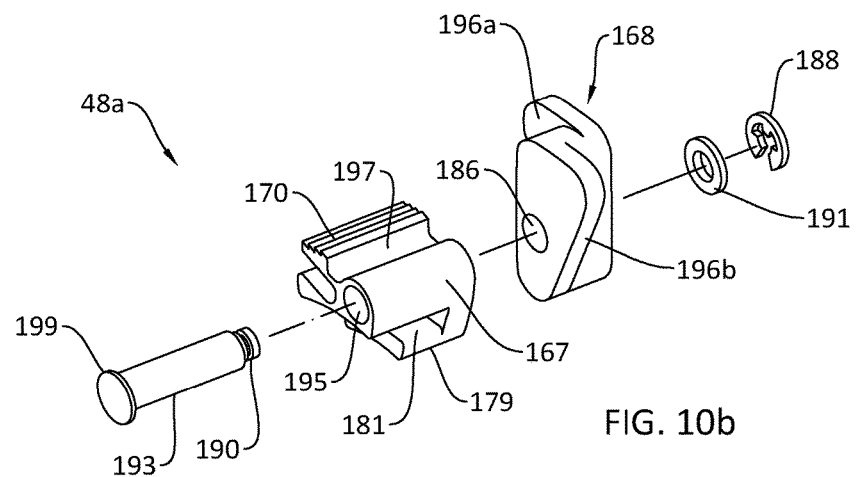
FIG. 10B is an exploded, top, right, front perspective view of another embodiment of a means of the engagement member, wherein a pawl and carrier configured as a single member rather than the multiple parts illustrated in FIG. 10A.

Referring to FIGS. 10a and 10b, the preferred embodiment of the engagement member 48, benefits from conventional manufacturing techniques and material properties. Notwithstanding, the engagement member 48 may be configured with fewer parts. For example, engagement member 48a includes a body 167 made of flexible, high strength material and includes the hinge arm 197, and the aperture 195. Post 193 includes shoulder 199 and is received within an aperture 195 of body 167 and within aperture 186 of the pressure pad 168 with sufficient tolerance to allow relative rotation between the body 167 and pressure pad 168. Aside from this difference, the remaining components, e.g. teeth 170, curb 179, and recess 181, are as described herein in reference to the preferred embodiment.

Figure 11:
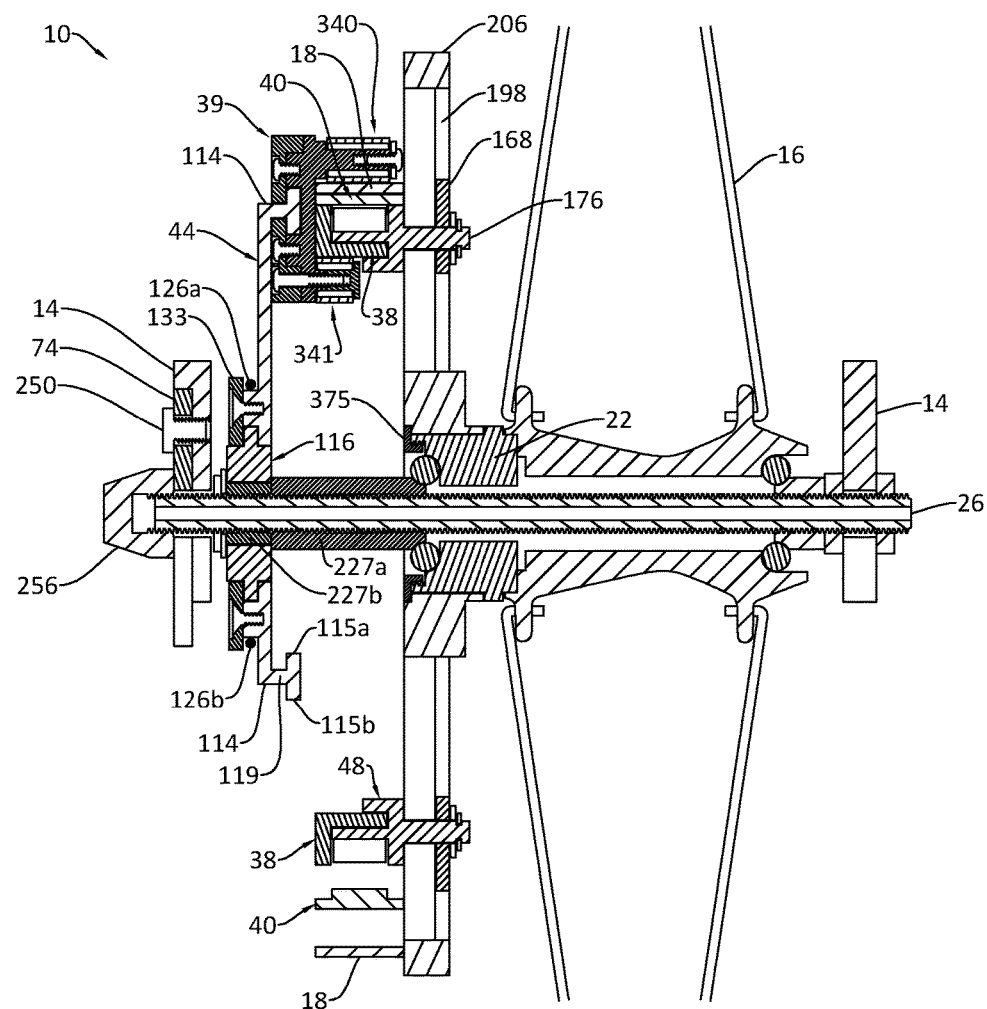
FIG. 11 is a cross-sectional view of the transmission of FIG. 2.
Figure 12:
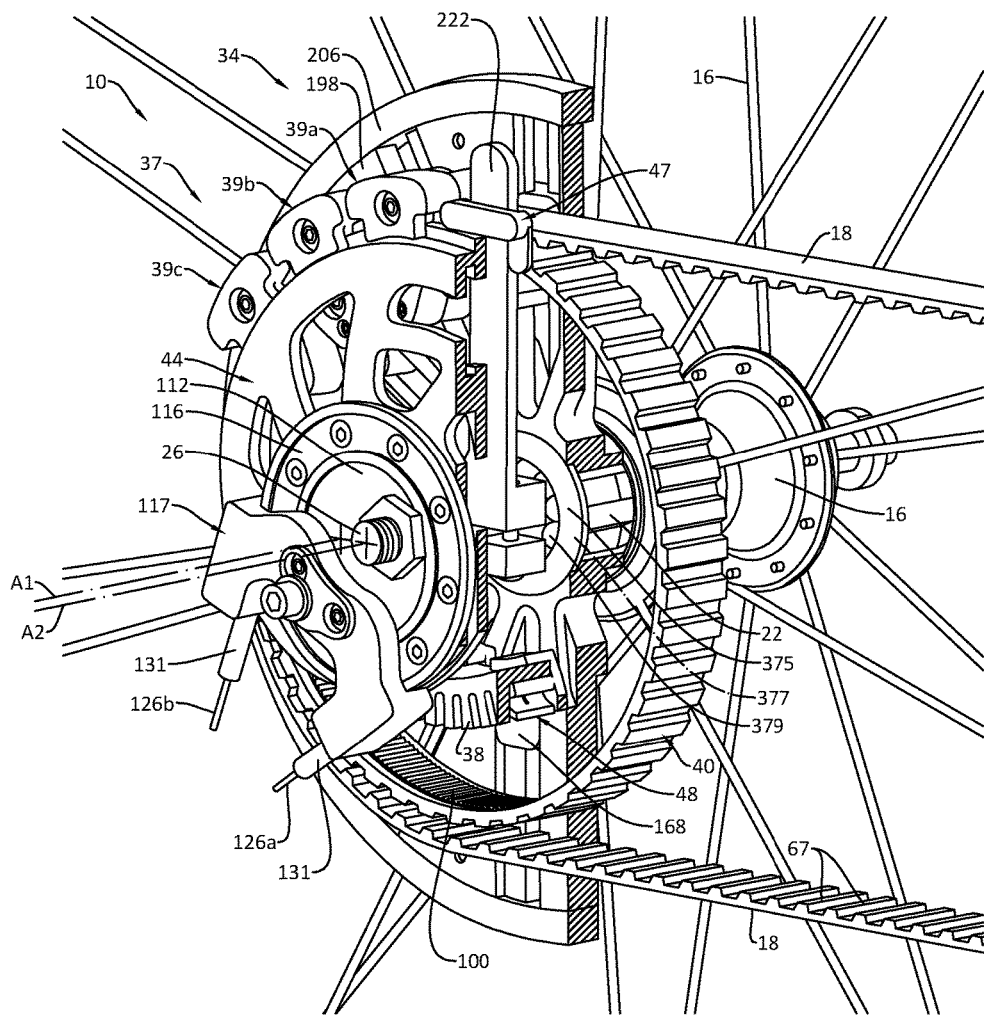
FIG. 12 is a top, right, front perspective view off the transmission of FIG. 2, wherein the pivot assembly and driven assembly are shown in section generally taken at the vertical intersection of the driven axis.

Referring to FIGS. 3, 9, and 11 the driven assembly 34 includes a driven member 198 having a plurality of slots 200, such as the illustrated radial slots 200, for receiving corresponding pressure pads 168 and a central aperture, e.g. the illustrated fluted aperture 201, for mounting onto the freehub 20 (FIGS. 3 and 11). Being that the aperture 201 and freehub 20 are correspondingly fluted, they necessarily rotate together without relative slippage. The central axes of the central aperture 201 and freehub 20 are coaxial and define driven assembly axis A2.

Referring to FIG. 9, the support ring 206 (shown partially) includes a plurality of tabs 208 which are engaged in corresponding receptors 209 (hidden) which have the same shape profile. The support ring 206 is fixedly attached to the driven member 198 by fasteners 210 which are engaged in corresponding pairs of apertures 212, 214.

Referring to FIG. 14, each radial slot 200 is stepped, having front and rear sections 202a and 202b, and center section 204 which respectively receive the shoulders 196a and 196b of the corresponding pressure pad 168. The pressure pad 168 is slidably secured within the slot 200 with sections 202a and 202b of the driven member 198 being sandwiched between the corresponding pressure pad shoulders 196a and 196b.

Each pressure pad 168 can move within its respective slot 200 radially relative to the driven assembly axis A2. Accordingly, the distance from the driven assembly axis A2 whereat a particular pressure pad 168 acts against the driven member 198 is adjustable to correspond to a desired gear ratio, as explained in greater detail further below. It is to be understood that although radial slots 200 are illustrated herein, slots of other shapes e.g. arcuate or curvilinear, or arrangements e.g. skewed, may also suitably allow the pressure pad 168 to slidably move a distance relative to the driven assembly axis A2.

The driven member 198 is sufficiently rigid to maintain its structural integrity over force being applied by one or more of the pressure pads 168. Not to be construed as limiting, the driven member 198 may be formed of plastic, metal or other high-strength, rigid material.

As it will be understood by those skilled in the art there are numerous ways in which the driven assembly 34 may be attached to an output member, e.g. being welded, fastened, or otherwise, or wherein the driven assembly 34 itself acts as an output member, e.g. configuring the driven assembly 34 into a variation of a bicycle tire, fly wheel, shaft or gear.

Referring to FIGS. 3, 5, 7A, and 8, the roller assembly 37 includes roller clamp assemblies 39a, 39b, and 39c which are configured to slidingly engage and travel about race 114 and flange 115 (115A and 115B). Travel of roller clamp assemblies 39a, 39b, and 39c about race 114 is constrained by stop 333 which is fixedly attached to pivot frame 44 with treaded fastener 337 received through aperture 335 and engaged with a threaded aperture 331.

Roller clamp assemblies 39b and 39c are rotatably coupled by link 45 so as to maintain adjacency and separating distance as they travel about race 114. Link 45 includes tabs 49 which are pivotally engaged within apertures 61 of receptors 27a and 27b. Receptors 27a and 27b are recessed such that the rightward face of link 45 does not restrict the sliding movement of track 115 within opening 28 or pivotable movement of clamp assemblies 39b and 39c.

Roller assembly 39a is rotatably coupled to guide link 47 which is slidingly engaged to control arm 222 of guide 221. Guide 221 is fixedly secured relative to driven assembly axis A2 such that as pivot frame 44 is remotely rotated by the user the position of roller assembly 37 in relation to pivot assembly 36 is controlled as it travels about race 114.

Figure 7A:
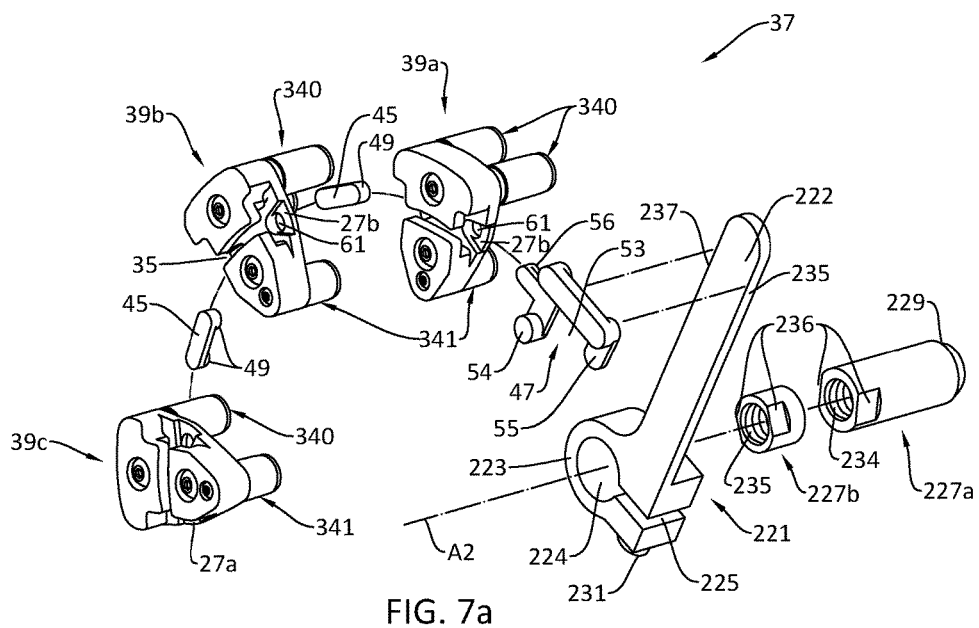
FIG. 7A is an exploded, top, right, front perspective view of the roller assembly of FIG. 3.
Figure 8:
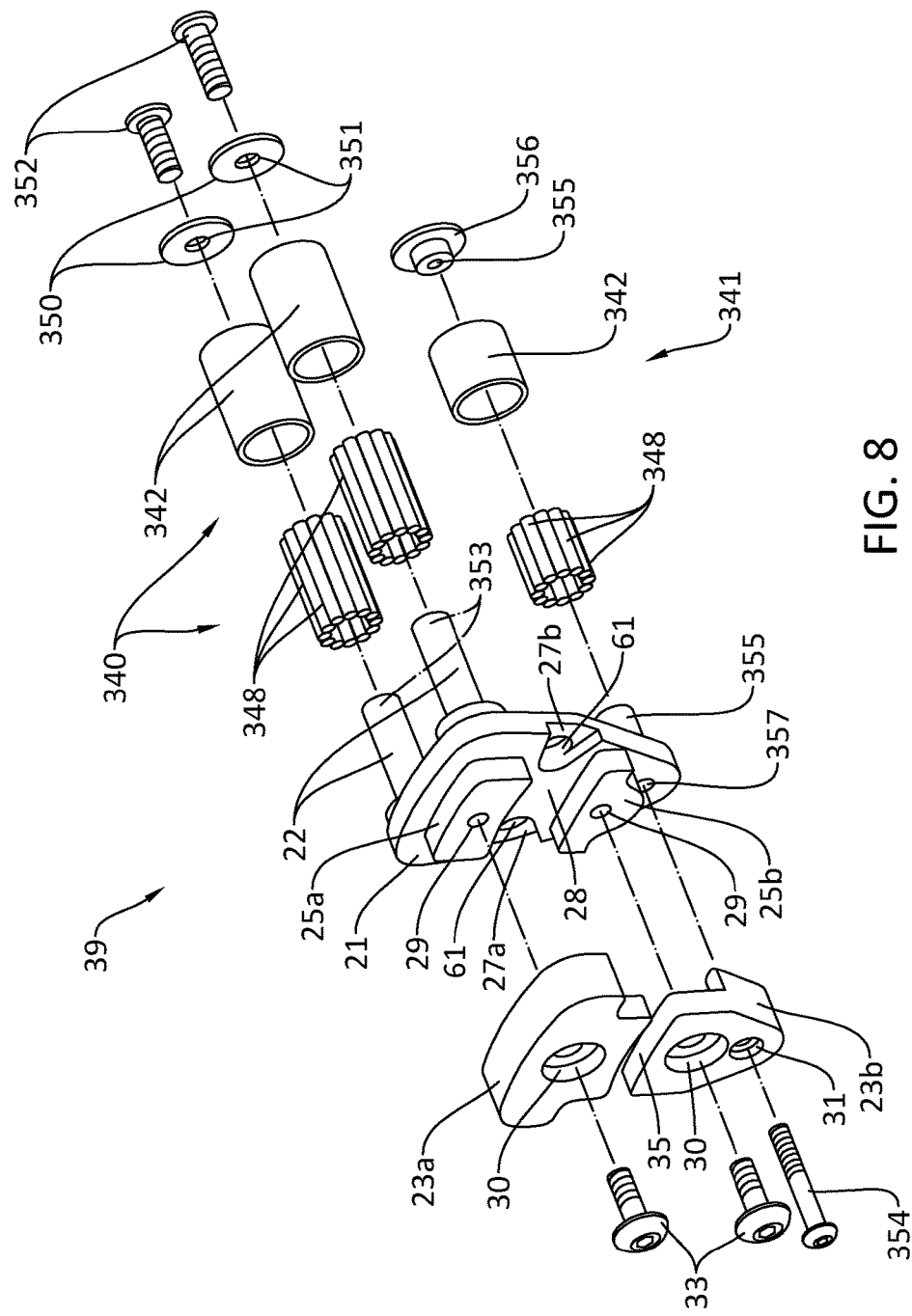
FIG. 8 is an exploded top, right, front perspective view of the roller clamp assembly which forms part of the roller assembly of FIG. 7A.

Referring to FIGS. 7A, 8, and 11, the roller clamp assemblies 39a, 39b, and 39c (39) include two upper bearing assemblies 340 and one lower bearing assembly 341 which include similar numbered components except as indicated. The two upper bearing assemblies 340 are of equal, but longer dimension than the lower bearing assembly 341.

The upper bearing assemblies 340 and lower bearing assembly 341 include a plurality of pin bearing 348 rotatably disposed over shaft 22, and assist in allowing the sleeve 342 to rotate relative to the shaft 22 of the base 21.

The upper bearing assemblies 340 include a cap 350 secured to post 22 with fastener 352 received within aperture 351 and secured within aperture 353 (not shown).

The lower bearing assembly 341 includes a cap 356 secured to post 355 with fastener 354 received within apertures 31 and 357, and secured within threaded aperture 355.

Referring to FIGS. 7 and 8, each roller clamp assembly 39 is configured to slidingly engage track 114 of pivot frame 44 within openings 28 and 35 and includes a cap 23a, and a cap 23b, fixedly disposed over corresponding curb 25a and curb 25b with fasteners 33 received within apertures 30 and secured within threaded apertures 29. Aperture 30 is recessed such that head of fasteners 33 remains below the face of cap 23a and cap 23b.

Figure 7B:
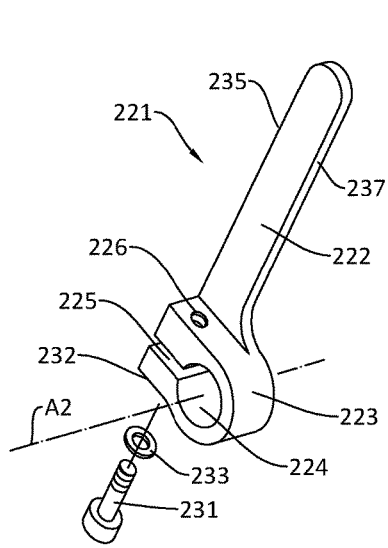
FIG. 7B is a top, left, rear perspective view of the guide assembly which forms part of the roller assembly of FIG. 7A.

Referring to FIGS. 3, 7a and 7b, the guide 221 controls movement of the roller assembly 37 and thusly the position of the engage/release zone 162 (FIG. 15).

Referring to FIGS. 7a and 7b, guide 221 is disposed over sleeve 227A through aperture 224, and is secured in position by tightening fastener 231 which is received through washer 233, the first aperture 232 (not shown), and engaged within a threaded aperture 226 of the bracket 223. Fastener 231 includes slot 225 whereby the diameter of aperture 224 is adjustable by tightening or loosening fastener 231 thereby causing section 232 to be pivoted about aperture 224.

Figure 7C:
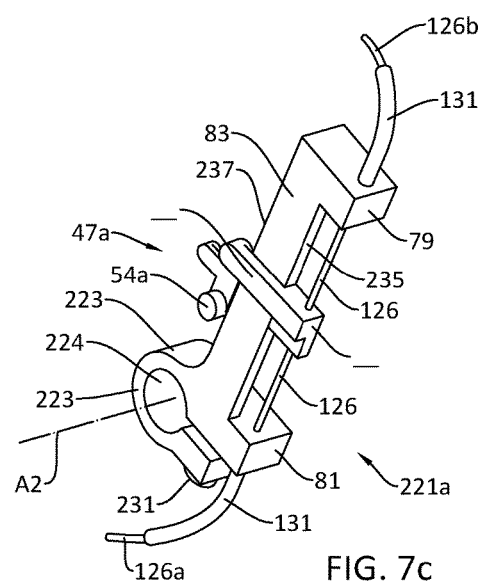

Although a preferred embodiment of the pivot assembly 36 and roller assembly 37 has been described in reference to the drawings, other types of adjustment means which can pivot the driver assembly 32 about driver assembly axis A1 are within the scope of the present invention. FIGS. 5C and 7C represent an example of alternative embodiment of means of adjusting the pivot assembly 36 and roller assembly 37; wherein the position of guide link 47 and thusly roller assembly 37 is adjustable relative to control arm 222 by tightening or loosening of control cables 126a and 126b, and being that the position of guide link 47 is offset forward of pivot axis A1, and that pivot frame 44 is slidingly engaged to roller assembly 37, pivot assembly 44 is caused to rotate about axis A1. The alternative adjustment means is illustrated in FIG. 5C, wherein a cable bracket 117 is not included.

Figure 13A:
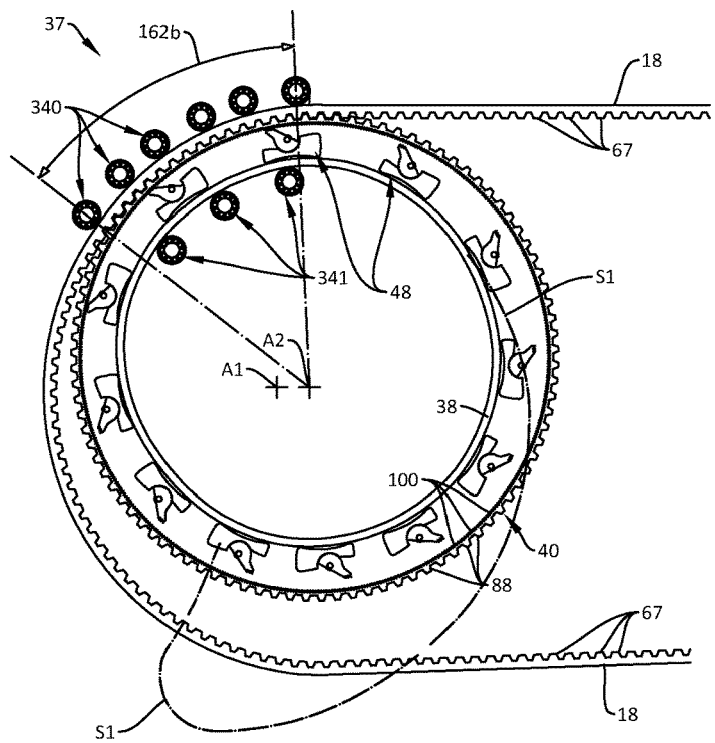
FIG. 13A is a fragmented right side view of the driver and roller assemblies of FIG. 3, and showing the driver assembly being disposed in an intermediate gear position (a representation of the pivot assembly position is shown in dashed lines) and engage/release zone wherein pawls communicate with an internally toothed ratchet of the torque band.

Referring to FIG. 13A the transmission 10 is represented in an intermediate gear position wherein a pivot frame 44 is represented as dashed lines in spiral Si. As the engagement members 48 are caused to travel about the guide band 38, they initially engage and release the internally tooth ratchet 86 in the engagement/release zone 162B.

Because torque band 40 and guide band 38 may be made of flexible, high strength materials and are biased to retain a circular shape, and because the diameter of torque band 40 is greater than that of guide band 38, the radial distance between torque band 40 and guide band 38, and thusly engagement members 48, increase in relation to the circumferential distance from engagement/release zone 162B.

Figure 13B:
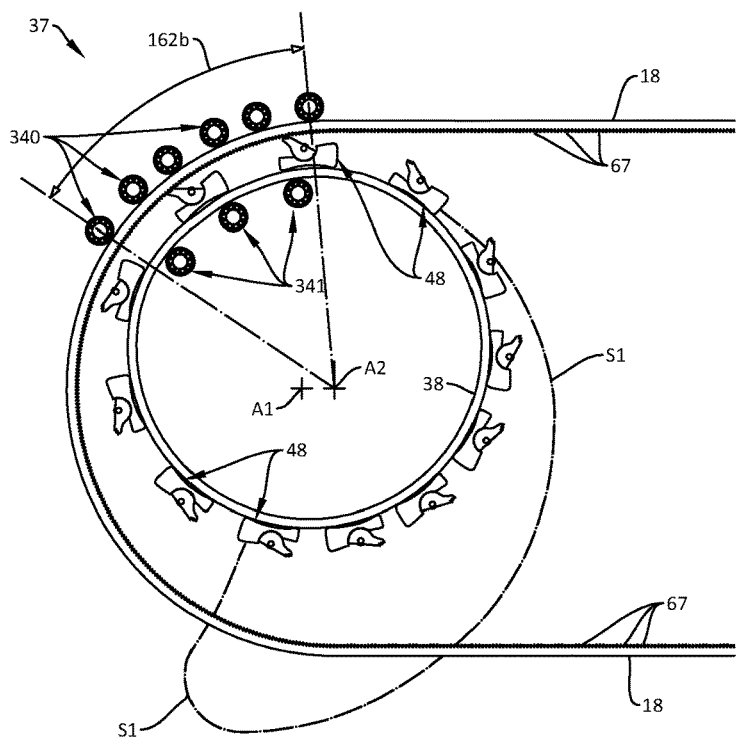
FIG. 13B is a fragmented right side view of another embodiment of the driver and roller assemblies of FIG. 12A, wherein the toque band is not included, and the drive belt includes internally directed teeth which form the internally toothed ratchet which communicates with pawls of the means of engagement member.

Referring to FIG. 13B, a side view of an alternative driver assembly 32 is illustrated wherein a torque band 40 is not included, and engagement members 48 communicate with drive belt 18, which may be made of flexible, high strength materials and may include a plurality of internally directed teeth 100 which selectively engage the engagement members 48 traveling on the circumference of the guide band 38, causing the driven assembly 34 to rotate about its geometric center, identified as driven assembly axis A2.

Figure 14C:
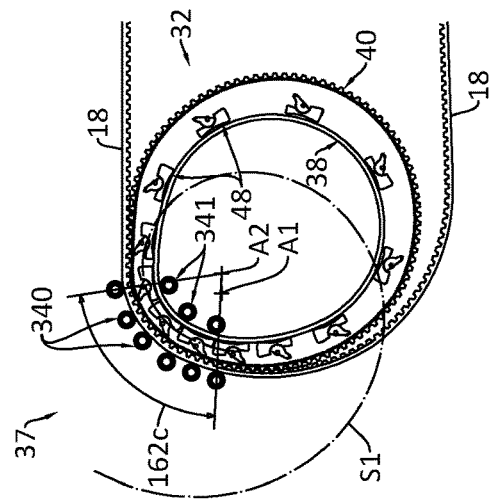
FIG. 14C is a fragmented right side view of the driver and roller assemblies of FIG. 3, and showing the driver assembly being disposed in a high gear position (a representation of the pivot assembly position is shown in dashed lines) and engage/release zone wherein pawls communicate with an internally toothed ratchet of the torque band.
Figure 14B:
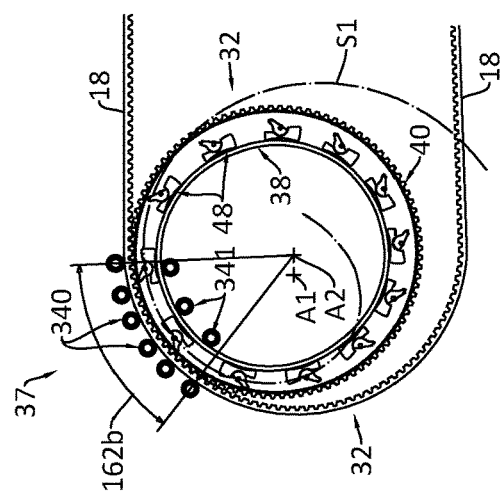
FIG. 14B is a fragmented right side view of the driver and roller assemblies of FIG. 3, and showing the driver assembly being disposed in an intermediate gear position (a representation of the pivot assembly position is shown in dashed lines) and engage/release zone wherein pawls communicate with an internally toothed ratchet of the torque band.
Figure 14A:
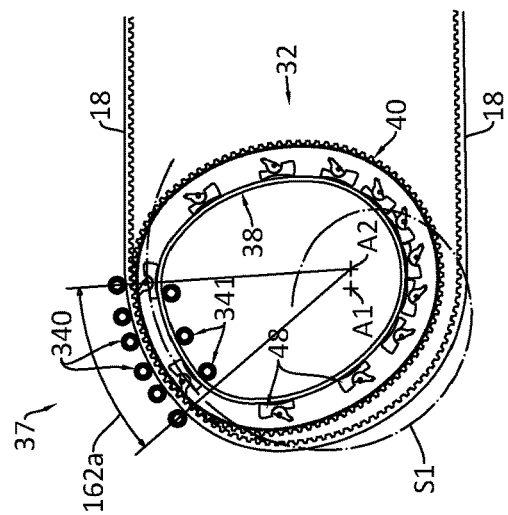
FIG. 14A is a fragmented right side view of the driver and roller assemblies of FIG. 3, and showing the driver assembly being disposed in a low gear position (a representation of the pivot assembly position is shown in dashed lines) and engage/release zone wherein pawls communicate with an internally toothed ratchet of the torque band.

Referring to FIGS. 14A-C, the transmission 10 is represented in different gear positions and wherein a pivot frame 44 is represented as dashed lines in spiral Si for comparison purpose.

FIG. 14A is a representation illustrating the relationship between the driver assembly 32 and a plurality of engagement member 48 during the engage and release zone 162a when the transmission 10 is in a low gear position.

And FIG. 14B is a representation of FIG. 16 illustrating the relationship between the driver assembly 32 and a plurality of engagement member 48 the engage and release zone 162b when the transmission 10 is in an intermediate gear position.

In contrast, FIG. 14C illustrating the relationship between the driver assembly 32 and a plurality of engagement member 48 during the engage and release zone 162c when the transmission 10 is in a high gear position.

The present invention provides a unique transmission which provides a continuously variable torque range, is fast to change, and can be adjusted under full load. The invention can be scaled to provide a torque range required for the particular use, and reduces profile and ground clearance compared to existing chain derailleurs.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

While the invention has been particularly shown and described with reference to preferred embodiments thereof, it will be understood by those skilled in the art that the foregoing and other changes in form and details can be made therein without departing from the spirit and scope of the invention.

That which is claimed is:

1. A transmission, comprising:
 a driver assembly that is pivotable about a first axis;
 a driven assembly rotatable about a second axis, said second axis spaced a distance from said first axis;
 a plurality of engagement members, each of said plurality of engagement members being in engagement with said driver assembly and said driven assembly;
 wherein said plurality of engagement members are adapted to transmit force from said driver assembly to said driven assembly such that said driven assembly rotates about said second axis and said plurality of engagement members rotate about said second axis in a path corresponding to a gear ratio; and wherein said driven assembly includes a driven member having a plurality of slots, wherein each of said plurality of engagement members is disposed within and moves within a respective slot of said plurality of slots; and said gear ratio being infinitely adjustable throughout a gear ratio range by pivoting said driver assembly about said first axis.

2. The transmission according with claim 1, wherein said first and second axes remain at a fixed distance relative to each other throughout said gear ratio range.

3. The transmission in accordance with claim 1, wherein said path is curvilinear.

4. The transmission in accordance with claim 1, wherein said path is eccentric.

5. The transmission in accordance with claim 1, wherein each of said plurality of engagement members moves radially within said respective slot of said plurality of slots relative to said second axis.

6. The transmission in accordance with claim 1, wherein each of said plurality of engagement members includes a pawl, a carrier and a pressure pad, wherein said pawl is rotatably attached to said carrier, and said carrier is rotatably attached to said pressure pad.

7. A transmission, comprising:
a driver assembly pivotable about a first axis;
a driven assembly rotatable about a second axis, said second axis spaced a distance from said first axis;
an engagement member in simultaneous engagement with said driver assembly and said driven assembly and wherein said engagement member is adapted to transmit force from said driver assembly to said driven assembly such that said driven assembly rotates about said second axis and said engagement member rotates about said second axis in a path corresponding to a gear ratio; and wherein said driven assembly includes a driven member having a plurality of slots, wherein each of said plurality of engagement members is disposed within and moves within a respective slot of said plurality of slots, and said gear ratio being infinitely adjustable throughout a gear ratio range by pivoting said driver assembly about said first axis.

8. The transmission in accordance with claim 7, wherein said path is curvilinear.

9. The transmission in accordance with claim 7, wherein said path is eccentric.

10. The transmission in accordance with claim 7, wherein said engagement member moves radially within said slot relative to said second axis.

11. The transmission in accordance with claim 7, wherein said engagement member includes a pawl, a carrier and a pressure pad, wherein said pawl is rotatably attached to said carrier, and said carrier is rotatably attached to said pressure pad.

* * * * *